United States Patent
Bustamante et al.

(10) Patent No.: US 7,612,314 B2
(45) Date of Patent: Nov. 3, 2009

(54) MANUFACTURING METHOD THAT USES LASER SURFACE TRANSFORMATION TO PRODUCE NEW AND UNIQUE SURFACE PROFILES FOR ROTATING BEARINGS

(75) Inventors: Anthony T Bustamante, Sterling Heights, MI (US); John Wilt, Midland, MI (US)

(73) Assignees: Chrysler Group LLC, Auburn Hills, MI (US); Adcole Corporation, Marlborough, MA (US)

(*) Notice: Subject to any disclaimer, the term of this patent is extended or adjusted under 35 U.S.C. 154(b) by 829 days.

(21) Appl. No.: 11/231,478

(22) Filed: Sep. 21, 2005

(65) Prior Publication Data

US 2006/0138100 A1 Jun. 29, 2006

Related U.S. Application Data

(60) Provisional application No. 60/638,941, filed on Dec. 23, 2004.

(51) Int. Cl.
*B23K 26/00* (2006.01)
*G03F 7/26* (2006.01)

(52) U.S. Cl. .................... 219/121.69; 430/302

(58) Field of Classification Search . 219/121.6–121.85; 430/302–304, 945
See application file for complete search history.

(56) References Cited

U.S. PATENT DOCUMENTS

| 5,648,127 A * | 7/1997 | Turchan et al. ............. 427/596 |
| 6,739,238 B2 * | 5/2004 | Ushijima et al. .............. 92/158 |
| 2001/0015180 A1 * | 8/2001 | Tinney ...................... 123/1 A |
| 2005/0188942 A1 * | 9/2005 | Hamada et al. .......... 123/193.4 |

* cited by examiner

*Primary Examiner*—Sang Y Paik
(74) *Attorney, Agent, or Firm*—Ralph E. Smith

(57) ABSTRACT

A laser ablation method is used to polish a bearing surface of an automotive crankshaft. A laser ablation device generates a laser according to parameters such as wavelength, pulse duration, pulse repetition rate, and beam quality. The laser is applied to the surface of a rotating engine component, such as a crankshaft, as the component is rotated in order to polish the surface according to the parameters. The laser substantially improves tribological performance of the bearing surface by changing the waviness and form of the surface profile. Further, oil-retention reservoirs are formed in the surface. As a result, the friction coefficient of the crankshaft surface is reduced while the roughness of the crankshaft surface is maintained, reduced, or increased.

10 Claims, 4 Drawing Sheets

MANUFACTURING METHOD THAT USES LASER SURFACE TRANSFORMATION TO PRODUCE NEW AND UNIQUE SURFACE PROFILES FOR ROTATING BEARINGS

CROSS-REFERENCE TO RELATED APPLICATIONS

This application claims the benefit of Provisional Patent Application Ser. No. 60/638,941, filed Dec. 23, 2004.

FIELD OF THE INVENTION

The present invention relates to modifying the surface finish of automotive rotation component bearing surfaces, and more particularly to modifying surface waviness and form using laser ablation.

BACKGROUND OF THE INVENTION

The surface profile of a material is a combination of roughness, waviness, and form. To produce bearing surfaces that meet performance requirements, conventional surface finishing reduces the roughness by polishing the ground bearing surfaces, such as pins and main bearing journals on an automotive crankshaft. An automotive crankshaft 10 is shown in FIG. 1. The automotive crankshaft 10 includes crankshaft bearings 12 and connecting rod bearings 14. Connecting rods 16 connect the crankshaft 10 to pistons 18. As the pistons 18 translate within the engine cylinders (not shown), the connecting rods 16 transfer rotational force to the crankshaft 10 via the connecting rod bearings 14. The crankshaft 10 rotates within the connecting rod bearings 14 and the crankshaft bearings 12. The crankshaft 10 rotates a flywheel 20 to transfer the rotational force to a vehicle transmission.

Connecting rods and main bearing shells of the crankshaft journal are subject to high tribological stress. Therefore, crankshafts, crankshaft bearings, and connecting rod bearings are highly susceptible to wear and deterioration due to heat, pressure, abrasion, and loss of lubrication. Conventionally, bearing surfaces on the crankshaft are polished using a combination of rotating and grinding to reduce the roughness of the crankshaft bearing surfaces. The crankshaft is polished using an abrasive material to remove inclusions, such as carbon nodules and dirt, that are embedded in the crankshaft surface during the manufacturing process. The abrasive material, such as abrasive tape or stone, removes the inclusions, but often leaves a relatively large open pore in the surface. The polishing process may then rub metal over these open pores, partially covering the pores with a projecting edge. These projecting edges are commonly called "ferrite caps" or "hooks." After assembly in an engine, these ferrite caps may break off, forming small abrasive particles that lead to premature bearing failure. The process to eliminate ferrite caps includes reversing the rotation of the crankshaft during the polishing.

SUMMARY OF THE INVENTION

A laser ablation method for altering a surface of an automotive component comprises determining desired characteristics of the surface. A plurality of parameters for a laser ablation device are selected according to the desired characteristics. A laser is generated at the laser ablation device according to the plurality of parameters. The laser is applied to the surface. Oil-retention reservoirs are formed in the surface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
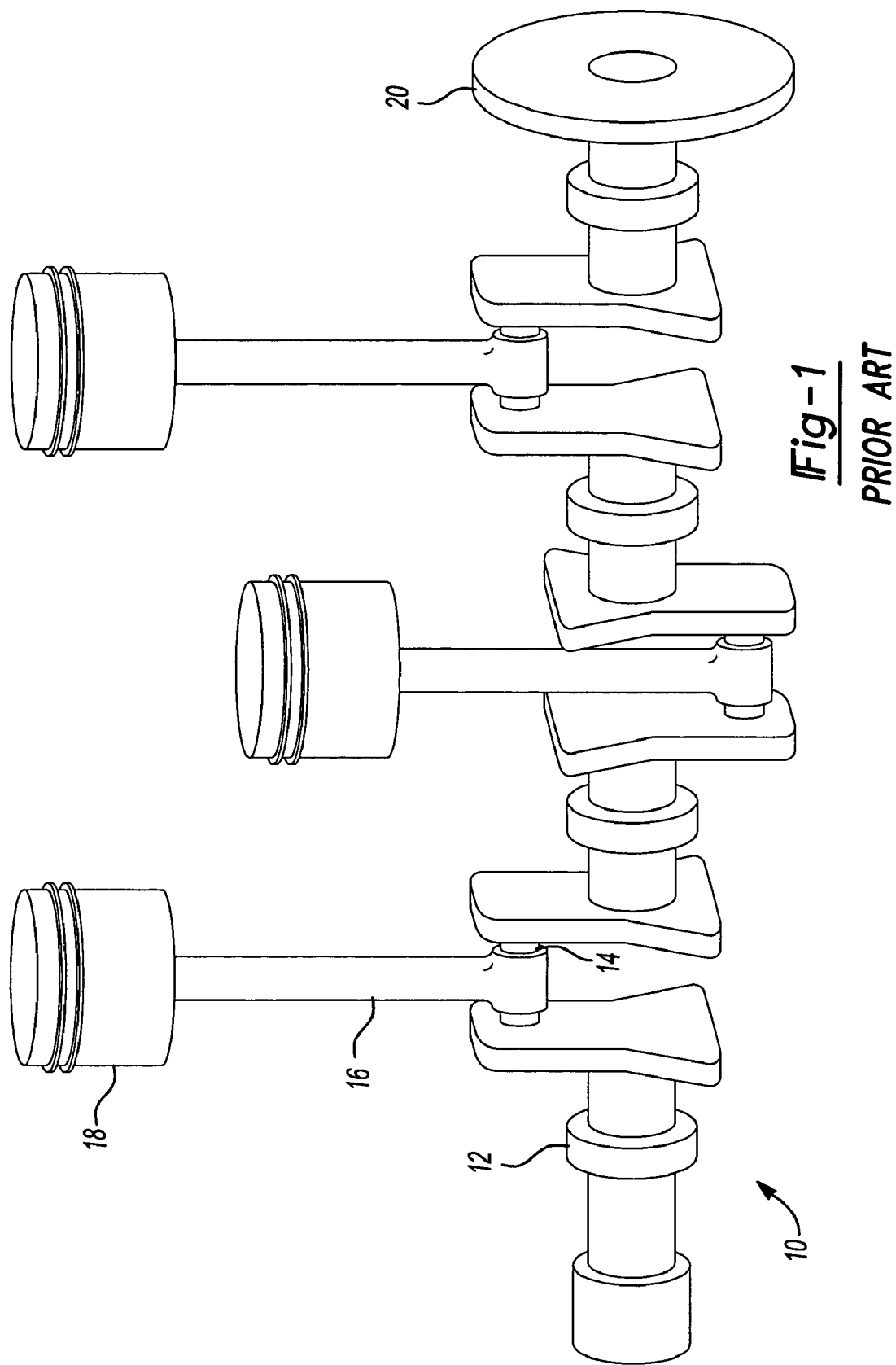
FIG. 1 illustrates an automotive crankshaft according to the prior art.
Figure 2:
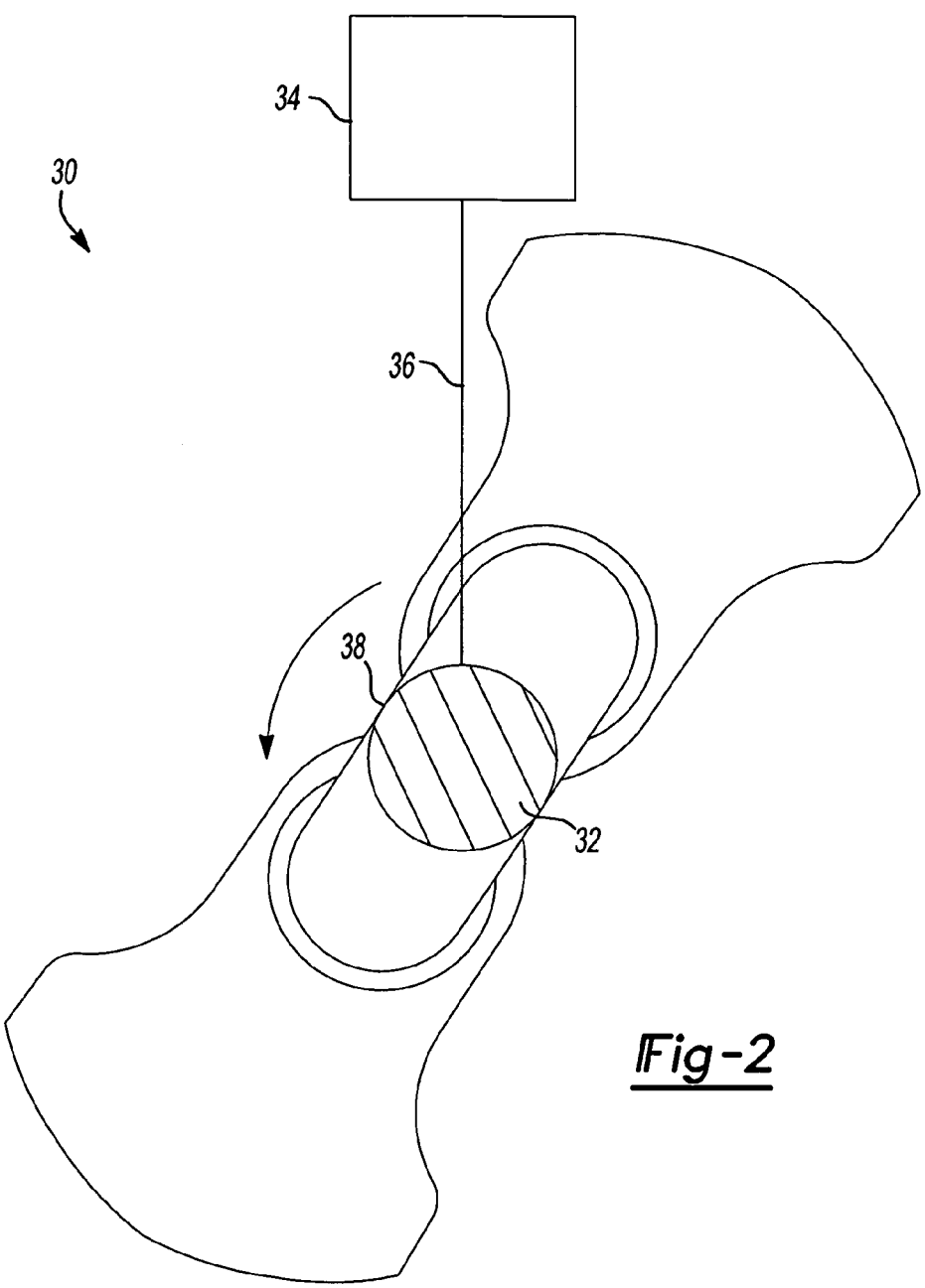
FIG. 2 illustrates laser ablation of an automotive crankshaft according to the present invention.

The laser ablation process of the present invention completely changes the waviness and form of surface roughness by increasing the slope of the various peaks, which translates into increased bearing surface. Hence the material roughness may measure the same, or somewhat rougher, after laser ablation, but the tribology is substantially improved due to flatter slopes. A laser ablation system 30 includes a crankshaft 32 (shown in cross-section) and a laser ablation device 34 as shown in FIG. 2. The laser ablation device 34 generates and applies a laser 36 to a crankshaft bearing surface 38. As a result, the crankshaft bearing surface 38 achieves a higher roughness and a lower friction relative to a surface treated by conventional abrasion techniques.

The surface profile of automotive crankshafts, as well as various other rotating components, is a combination of roughness, waviness, and form, all of which affect friction, oil retention, and other performance characteristics of the component. Further, although the roughness of the crankshaft surface due to pores, ferrite caps, and other irregularities increases friction between the crankshaft surface and the various bearings, a degree of roughness is necessary to maintain lubrication. The crankshaft retains oil and lubrication within grooves and pores in the crankshaft surface. Therefore, a balance between attaining a certain degree of roughness while minimizing friction is desired.

Figure 3:
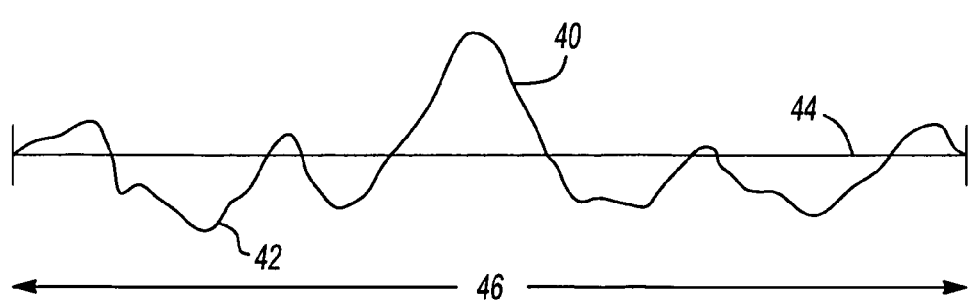
FIG. 3 illustrates roughness average according to the prior art.

Roughness average (Ra) is a commonly used parameter in the analysis of surface texture. The Ra value indicates an average value of the heights of peaks 40 and valleys 42 in a surface from a reference line 44 as shown in FIG. 3. The Ra value is calculated over a particular sample length 46. Because the Ra value is averaged over the sample length 46, outliers will not significantly affect the results. Other parameters that affect the overall roughness of a surface include, but are not limited to, peak count, valley count, average slope, and average frequency. However, for the purposes of the present invention, the Ra method is used when describing the roughness of the crankshaft surface.

The laser ablation effects removal of material from the surface of the crankshaft. The heat from the laser causes nearly instantaneous vaporization of the metal at the contact point of the laser. As the heat from the laser melts the metal on the crankshaft surface, the initially rough contour begins to accelerate toward a smoother surface because of the force of surface tension. The inclusions, which typically have less reflectivity than the surrounding substrate, are either completely submerged or vaporized. The inclusions are subsequently prevented from coalescing on the surface of the substrate by the oscillations or waves in the molten substrate as it moves. The resulting polished surface does not require further abrasive polishing. Additionally, any ferrite caps or hooks are vaporized.

Various parameters of the laser determine the effects of the ablation procedure, including, but not limited to, wavelength, pulse duration, pulse repetition rate, power density, and beam quality. For example, a wavelength with a minimum absorption depth allows for high energy deposition in a small volume of material, resulting in rapid and complete ablation. A short pulse duration maximizes peak power and minimizes thermal conduction to the surrounding material. Pulse repetition rate affects the energy efficiency of the laser ablation. Additionally, the effects of the laser ablation are determined by ablation depth of the material. Ablation depth is the depth in the material to which the ablation has a useful effect. The ablation depth is based in part on the absorption depth of the material, which is indicative of the ability of the material to absorb laser energy, and the heat of vaporization of the material.

Figure 4:
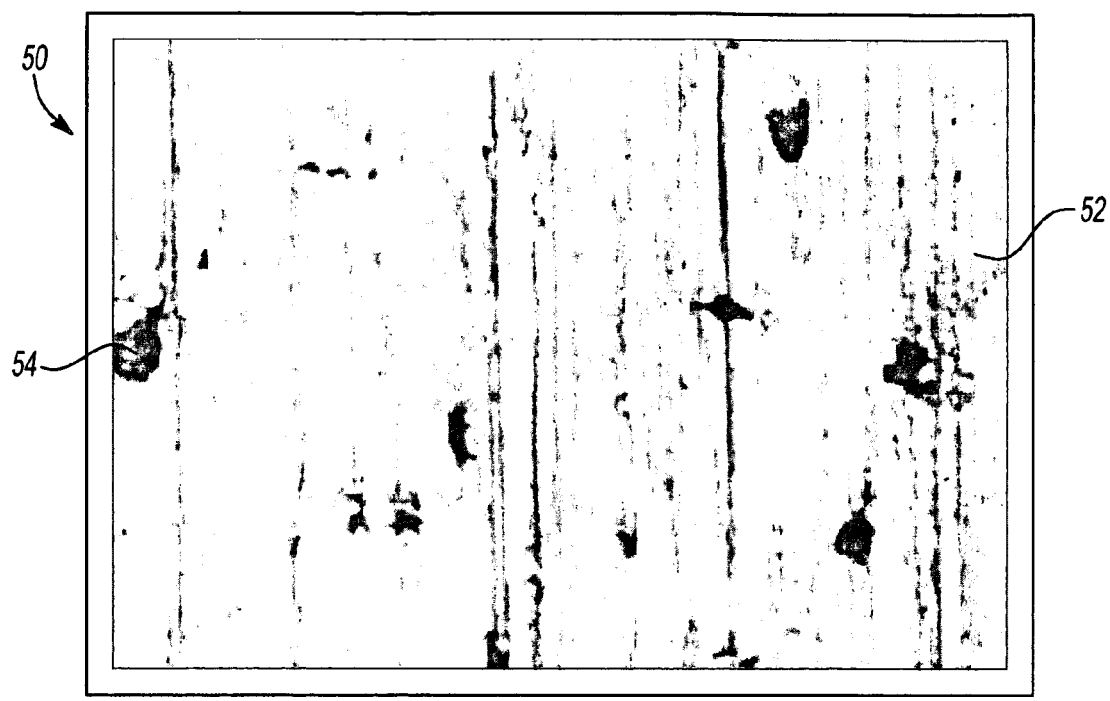
FIG. 4 illustrates a micrograph of a crankshaft surface according to the prior art.

A micrograph 50 of a crankshaft surface 52 prepared with conventional abrasive polishing techniques is shown in FIG. 4. While conventional polishing using abrasive methods removes portions of peaks on the surface profile, such methods have no effect on waviness. Additionally, the craters 54 left behind due to the removal of exposed ferrite-carbon nodules are unevenly formed and may include sharp corners.

Figure 5:
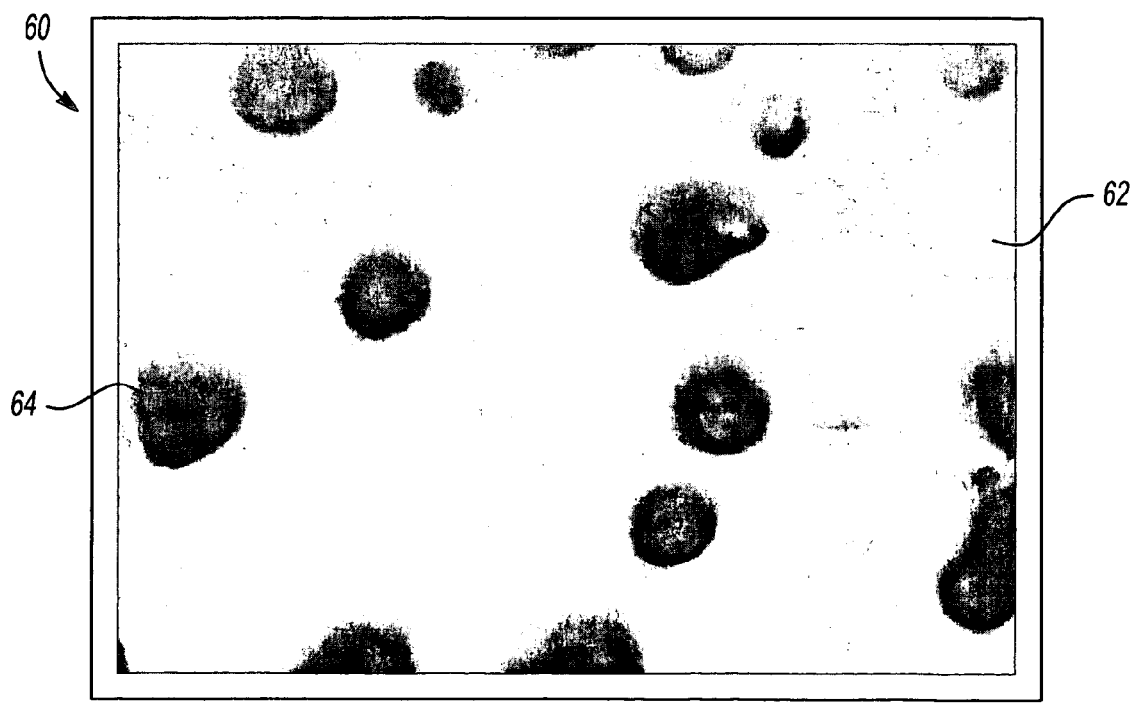
FIG. 5 illustrates a micrograph of a crankshaft surface according to the present invention.

A micrograph 60 of a crankshaft surface 62 prepared with the laser ablation polishing technique of the present invention is shown in FIG. 5. An excimer laser with a wavelength of 308 nanometers and a pulse duration of 23 nanoseconds was used. Additionally, multiple passes of the laser were performed, varying the power density between 2.0 and 4.0 joules per square centimeter. However, different parameters may be substituted to achieve similar results. For example, a 1.5 kilowatt diode laser having a wavelength greater than 800 nanometers allows the laser ablation to be completed after a single pass of the laser on the crankshaft surface 62.

The laser ablation process completely vaporizes any peaks caused by exposed ferrite-carbon nodules, resulting in craters 64. However, the heat absorption of the ferrite-carbon nodules is substantially higher than the heat absorption of the surrounding material. Therefore, the ferrite-carbon nodules absorb an extremely large amount of heat. As a result of the high temperature of the ferrite-carbon nodules, the surrounding material melts, and the nodules eventually explode rather than simply vaporizing. The further result of the melting substrate and nodule explosions is a series of craters 64, many of which are relatively shallow pockets. The craters 64 are highly effective for retaining oil during engine operation. Additionally, the slopes of the craters 64 are smoother and less severe than the slopes produced using conventional techniques, and the distance between the craters 64 is increased, resulting in a larger bearing surface. As such, the laser ablation polishing technique of the present invention results in substantially improved tribology of the crankshaft surface. Additionally, laser ablation reduces significant costs associated with conventional abrasive techniques, such as abrasive tape and lubrication materials.

Figure 6:
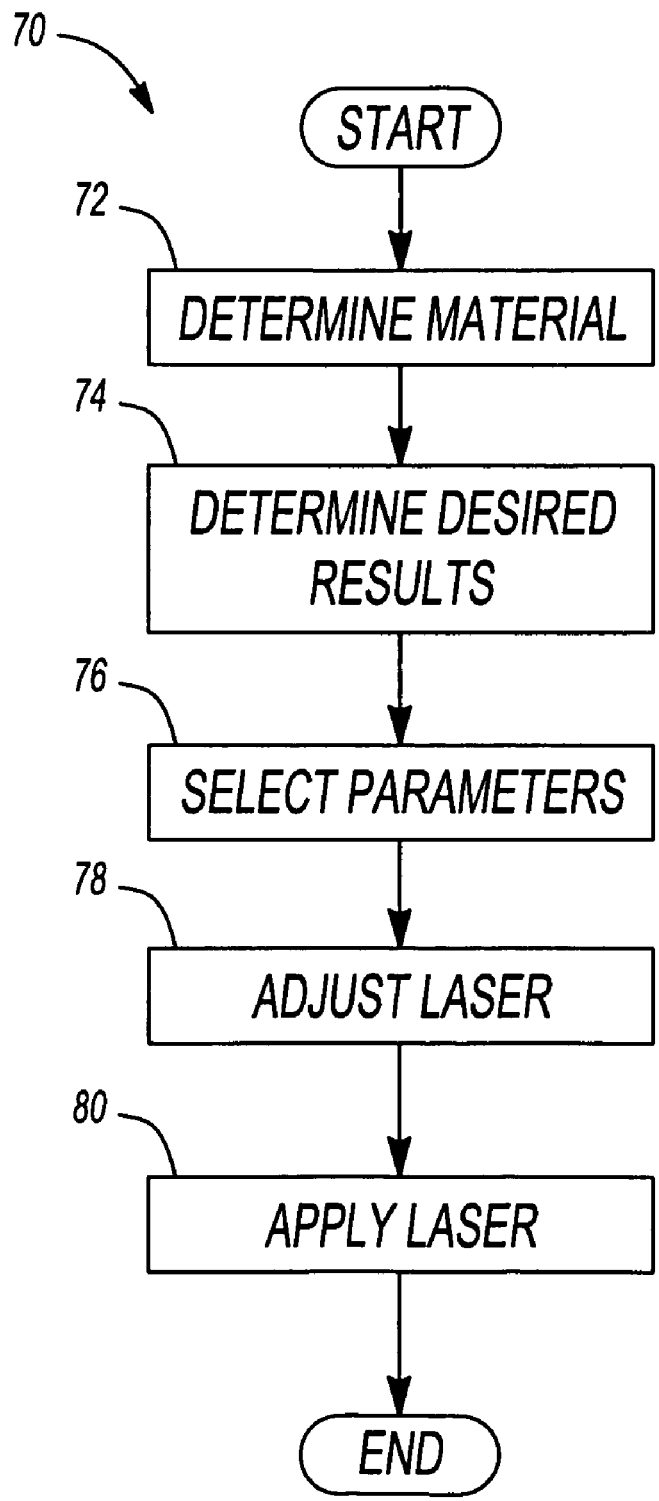
FIG. 6 is a flow diagram of a laser ablation method according to the present invention.

A laser ablation 70 method is shown in FIG. 6. At step 72, the surface material of the particular crankshaft or other component is determined. For example, different materials may react differently to the laser ablation process. Desired results and characteristics of the surface are determined at step 74. For example, varying degrees of roughness, friction, and/or oil retention may be desired based on the particular automotive component. At step 76, parameters for the laser are selected. At step 78, the laser is adjusted according to the selected parameters. The laser is applied to the crankshaft surface at step 80. The process is repeated for additional components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A laser ablation method for altering a surface of an automotive component comprising:
    determining desired characteristics of the surface, the surface being formed of a first material and including a plurality of exposed nodules of a second material, the second material having a higher heat absorption than the first material;
    selecting a plurality of parameters for a laser ablation device according to the desired characteristics;
    generating a laser at the laser ablation device according to the plurality of parameters;
    applying the laser to the surface;
    melting the first material of the surface with the laser;
    detonating the exposed nodules with the laser to form shallow pockets in the surface; and
    modifying a surface profile of the automotive component.

2. The laser ablation method of claim 1 wherein the desired characteristics include at least one of roughness, friction coefficient, oil-retention, and/or hardness.

3. The laser ablation method of claim 1 wherein the parameters include at least one of wavelength, power density, pulse duration, pulse repetition rate, and/or beam quality.

4. The laser ablation method of claim 1 wherein the automotive component is a rotating engine component.

5. The laser ablation method of claim 4 wherein the surface is a bearing surface of the rotating engine component.

6. The laser ablation method of claim 5, wherein the rotating engine component is a crankshaft.

7. The laser ablation method of claim 1 wherein the step of applying includes decreasing a friction coefficient of the surface and at least one of increasing and/or decreasing a roughness of the surface.

8. The laser ablation method of claim 7, wherein the step of modifying includes decreasing a friction coefficient of the surface and increasing a roughness of the surface.

9. The laser ablation method of claim 1 wherein the shallow pockets comprise oil-retention reservoirs in the surface.

10. The laser ablation method of claim 1, wherein the second material comprises ferrite-carbon.

* * * * *